US010783907B1

(12) United States Patent
Sapozhnikov et al.

(10) Patent No.: US 10,783,907 B1
(45) Date of Patent: Sep. 22, 2020

(54) READER WITH BI-LAYERED SIDE SHIELDS

(71) Applicant: Seagate Technology LLC, Cupertino, CA (US)

(72) Inventors: Victor Sapozhnikov, Minnetonka, MN (US); Taras Grigoryevich Pokhil, Arden Hills, MN (US); Mohammed Shariat Ullah Patwari, Edina, MN (US); Shaun Eric McKinlay, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/560,649

(22) Filed: Sep. 4, 2019

(51) Int. Cl.
*G11B 5/39* (2006.01)
*G11B 5/31* (2006.01)

(52) U.S. Cl.
CPC .......... *G11B 5/3932* (2013.01); *G11B 5/3146* (2013.01); *G11B 5/398* (2013.01); *G11B 5/3912* (2013.01); *G11B 2005/3996* (2013.01)

(58) Field of Classification Search
CPC ....... G11B 5/3906; G11B 5/115; G11B 5/398; G11B 5/3912; G11B 5/3909; G11B 5/3932; G11B 2005/3996
See application file for complete search history.

(56) References Cited

U.S. PATENT DOCUMENTS

| | | | | |
|---|---|---|---|---|
| 6,266,218 B1 * | 7/2001 | Carey | ................... | B82Y 10/00 360/324.12 |
| 8,462,467 B2 * | 6/2013 | Yanagisawa | ......... | G01R 33/098 360/319 |
| 8,576,518 B1 * | 11/2013 | Zeltser | ................ | G11B 5/3912 360/319 |
| 8,879,213 B2 * | 11/2014 | Isowaki | ............... | G11B 5/3163 360/319 |
| 8,922,950 B2 * | 12/2014 | Singleton | ................ | H01L 43/02 360/319 |
| 9,053,720 B1 * | 6/2015 | Chye | ..................... | G01R 33/098 |
| 9,076,468 B1 * | 7/2015 | Keener | ................ | G11B 5/3932 |
| 9,123,886 B2 * | 9/2015 | Zhang | ..................... | H01L 43/12 |
| 9,190,081 B2 * | 11/2015 | Aoyama | ................ | G11B 5/398 |
| 9,230,576 B1 | 1/2016 | Gill et al. | | |
| 9,230,577 B2 * | 1/2016 | Zhang | ................. | G11B 5/3932 |
| 9,390,735 B1 | 7/2016 | Wang et al. | | |
| 9,412,401 B2 * | 8/2016 | Du | ........................ | G11B 5/3912 |
| 9,601,138 B1 * | 3/2017 | Garfunkel | ............ | G11B 5/3912 |
| 9,633,679 B2 * | 4/2017 | Singleton | ............. | G11B 5/3912 |
| 9,659,586 B1 * | 5/2017 | Sapozhnikov | ....... | G11B 5/3906 |
| 9,666,214 B1 * | 5/2017 | Bertero | ................ | G11B 5/3906 |
| 9,870,791 B1 * | 1/2018 | Sapozhnikov | ....... | G11B 5/1272 |
| 9,886,974 B2 | 2/2018 | Stokes et al. | | |
| 10,068,601 B1 * | 9/2018 | Li | ........................ | G11B 5/6082 |
| 10,090,008 B2 * | 10/2018 | Ge | ........................ | G11B 5/3912 |

(Continued)

*Primary Examiner* — Brian E Miller
(74) *Attorney, Agent, or Firm* — Westman, Champlin & Koehler, P.A.

(57) ABSTRACT

A reader includes a free layer and a side shield that biases the free layer. The side shield includes a main bias layer having a first magnetic moment value and a first magnetization direction. The side shield also includes a compensation bias layer having a second magnetic moment value that is less than the first magnetic moment value and a second magnetization direction that is opposite to the first magnetization direction.

20 Claims, 6 Drawing Sheets

(56) References Cited

U.S. PATENT DOCUMENTS

| | | | |
|---|---|---|---|
| 10,115,418 B2 * | 10/2018 | Quan | G11B 5/3912 |
| 10,115,419 B2 * | 10/2018 | Xiao | G11B 5/11 |
| 2004/0086751 A1 * | 5/2004 | Hasegawa | B82Y 10/00 |
| | | | 428/815 |
| 2004/0109265 A1 * | 6/2004 | Gill | G11B 5/3906 |
| | | | 360/324.12 |
| 2005/0264955 A1 * | 12/2005 | Freitag | G11B 5/3932 |
| | | | 360/324.12 |
| 2006/0002039 A1 * | 1/2006 | Hasegawa | B82Y 25/00 |
| | | | 360/324.11 |
| 2006/0077597 A1 * | 4/2006 | Tanaka | H01F 10/187 |
| | | | 360/324.1 |
| 2011/0051291 A1 * | 3/2011 | Miyauchi | B82Y 10/00 |
| | | | 360/245.3 |
| 2011/0279923 A1 * | 11/2011 | Miyauchi | B82Y 10/00 |
| | | | 360/75 |
| 2012/0087046 A1 * | 4/2012 | Yanagisawa | G01R 33/098 |
| | | | 360/294 |
| 2014/0004385 A1 * | 1/2014 | Colak | G11B 5/3912 |
| | | | 428/815 |
| 2014/0268417 A1 * | 9/2014 | Singleton | G11B 5/115 |
| | | | 360/123.12 |
| 2014/0268428 A1 * | 9/2014 | Dimitrov | G11B 5/3912 |
| | | | 360/313 |
| 2015/0147481 A1 * | 5/2015 | Braganca | C25D 5/48 |
| | | | 427/529 |
| 2015/0221325 A1 | 8/2015 | Ho et al. | |
| 2015/0325260 A1 * | 11/2015 | Singleton | G11B 5/3912 |
| | | | 360/319 |
| 2016/0365104 A1 * | 12/2016 | Ge | G11B 5/3912 |
| 2017/0125046 A1 * | 5/2017 | Stokes | G11B 5/1475 |

\* cited by examiner

READER WITH BI-LAYERED SIDE SHIELDS

SUMMARY

In one embodiment, a reader is provided. The reader includes a free layer and a side shield that biases the free layer. The side shield includes a main bias layer having a first magnetic moment value and a first magnetization direction. The side shield also includes a compensation bias layer having a second magnetic moment value that is less than the first magnetic moment value and a second magnetization direction that is opposite to the first magnetization direction.

In another embodiment, a method of forming a reader includes forming a free layer, and forming a side shield that biases the free layer. Forming the side shield includes forming a main bias layer having a first magnetic moment value and a first magnetization direction. Forming the side shield also includes forming a compensation bias layer having a second magnetic moment value that is less than the first magnetic moment value and a second magnetization direction that is opposite to the first magnetization direction.

In another embodiment, a recording head is provided. The recording head includes a free layer, a first side shield on a first side of the free layer, and a second side shield on a second side of the free layer. The first and second side shields are configured the bias the free layer. Each of the first and second side shields includes a main bias layer having a first magnetic moment value and a first magnetization direction. Each of the first and second side shields also includes a compensation bias layer having a second magnetic moment value that is less than the first magnetic moment value and a second magnetization direction that is opposite to the first magnetization direction. A spacer layer is included between the main bias layer and the compensation bias layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to readers that employ bi-layered side shields to improve cross-track resolution. However, prior to providing details regarding the different embodiments, a description of an illustrative operating environment is provided below.

Figure 1:
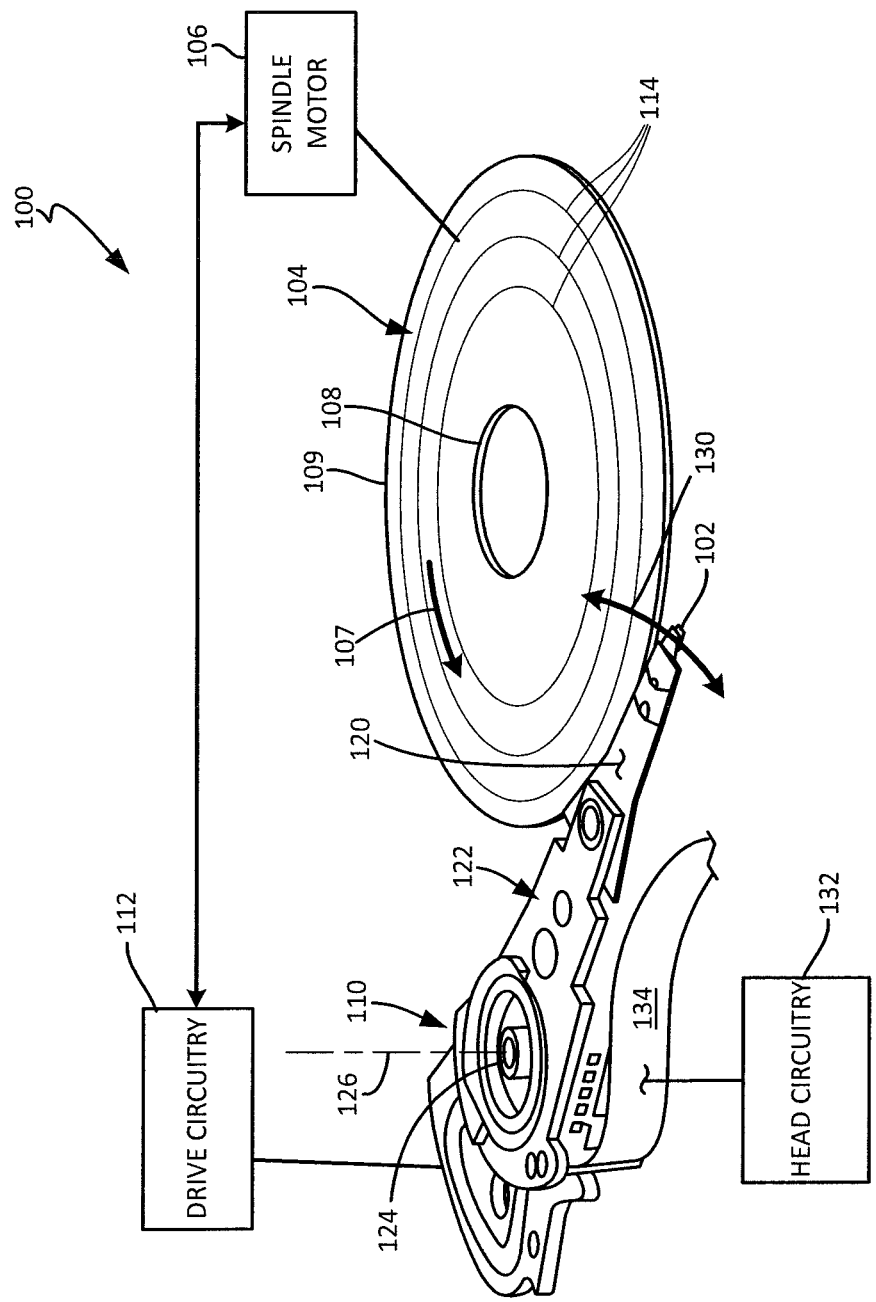
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. Data storage device 100 may be characterized as a hard disc drive (HDD). In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
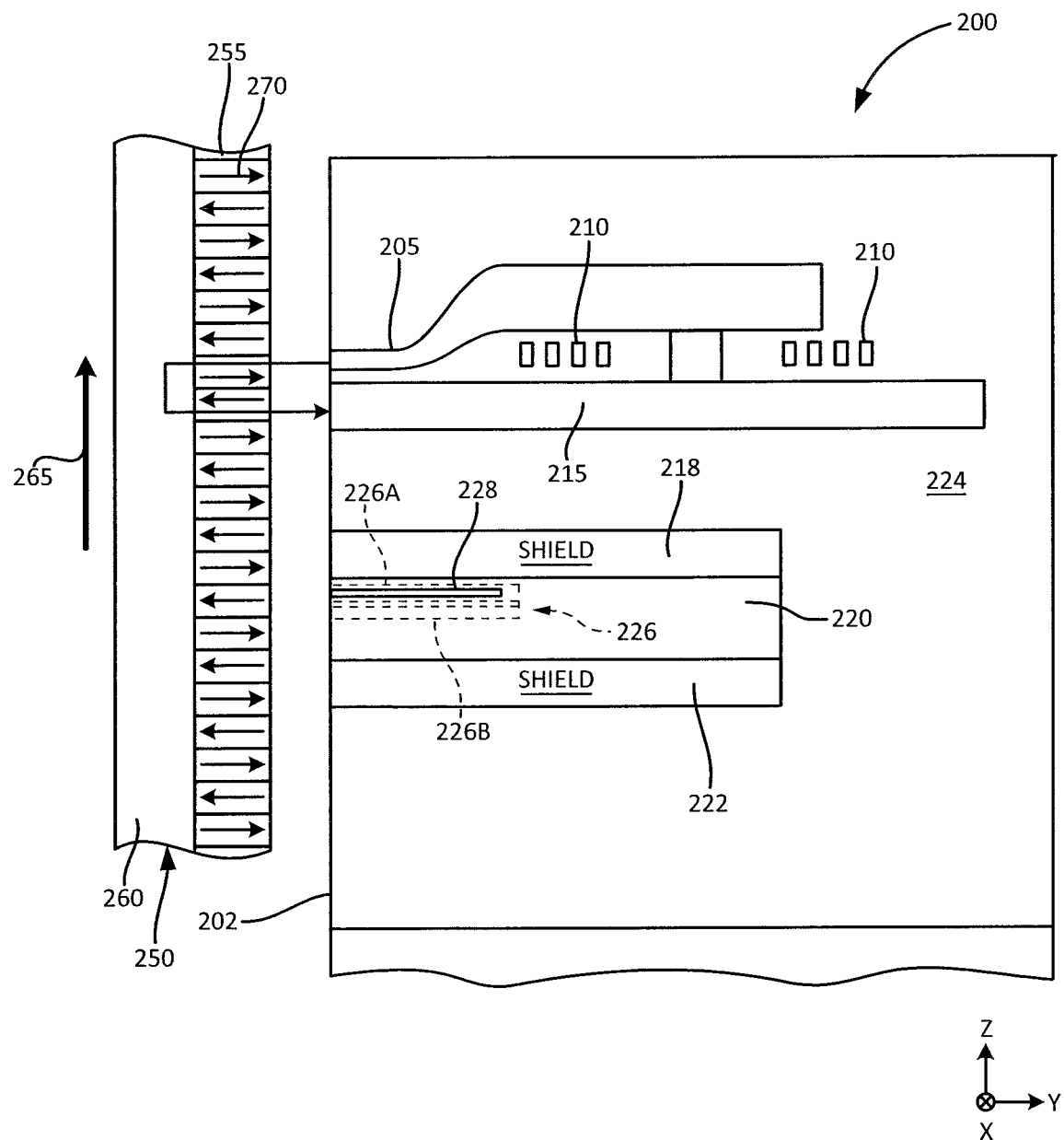
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222, side shields (e.g., side shield 226 shown by dashed lines is one of two side shields) and a wafer overcoat 224. Read transducer 220 includes a free layer 228 that is a primary element for carrying out read operations. Read transducer 220 and the shields for read transducer 220 (e.g., top shield 218, bottom shield 222 and the side shields) are together referred to herein as a read head or reader. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255 with the help of free layer 228, and is used in retrieving information previously recorded to layer 255.

Cross-track resolution of a reader, which is characterized by MT10 and MT10/MT50, is of importance to areal density capability of a HDD. MT10 is a distance between two positions on opposite sides of a narrow track or micro track (MT) on a data storage medium at which a sensed signal strength decreases to 10% of its maximum. MT50 is a distance between two positions on opposite sides of a MT on a data storage medium at which a signal strength decreases to 50% of its maximum. Cross-track resolution of a reader depends on magnetic characteristics of its side shields; the higher the side shield saturation magnetization ($M_s$) and/or thickness (t) and the thinner the free layer-side shield isolation at the junction (e.g., region where the side shield is closest to the free layer), the better the cross-track resolution. However, increasing these characteristics also increases the free layer bias, which reduces a readback signal amplitude and can thus reduce the reader signal-to-noise ratio (SNR). As will be described herein, embodiments of the disclosure improve the shielding of the media field and thus improve MT10 and MT10/MT50 without degrading the readback signal amplitude/SNR.

Embodiments of the disclosure provide a reader with side shields having two layers magnetized in the opposite directions. This allows for an increase in the side shield $M_s$ and/or t without degrading the readback signal amplitude.

In the embodiment shown in FIG. 2, side shield 226 includes a first layer 226A magnetized in a first direction and a second layer 226B magnetized in a second direction that is opposite to the first direction. Layers 226A and 226B may be stacked along a track direction (e.g., a z-direction in FIG. 2). A track width direction is perpendicular to the track direction (e.g., a cross-track direction, which is an x-direction in FIG. 2). A y-direction in FIG. 2 is then defined as a direction that is perpendicular to x and z simultaneously, which is a stripe-height direction. A bearing surface view of one reader embodiment having a bi-layered side shield structure is described herein in connection with FIG. 3.

Figure 3:
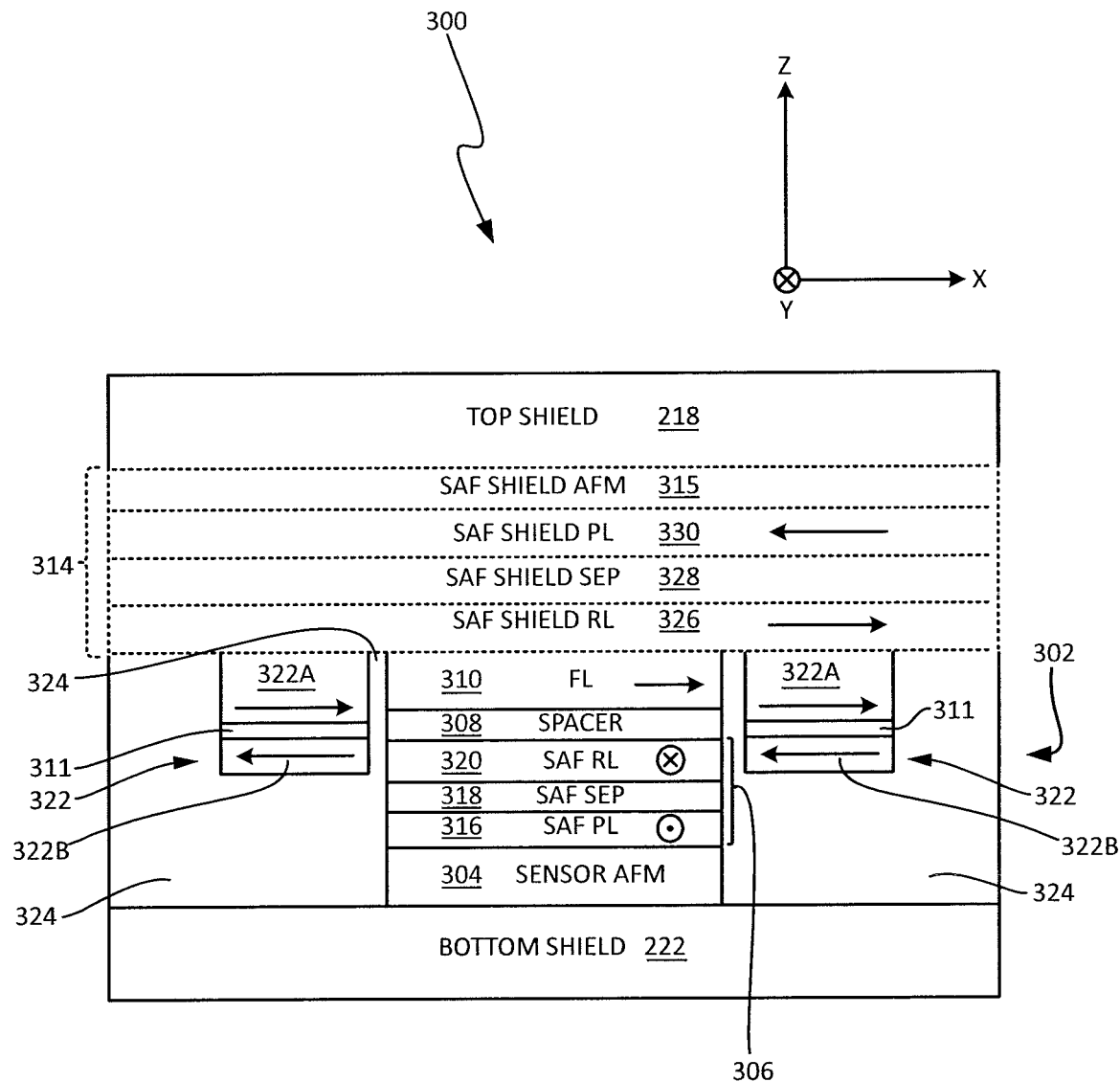
FIG. 3 is a bearing surface view of a magnetic reproducing device in accordance with one embodiment.

FIG. 3 is a schematic block diagram illustrating a bearing surface view of an example embodiment of a read head or reader 300 including a bi-layered side shield structure. Read head 300 includes a magnetoresistive sensor 302 that is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, a sensor stack synthetic antiferromagnetic (SAF) structure 306, a spacer layer 308 and a free layer 310. A stack cap layer (not shown) may also be included above the free layer 310. An SAF shielding structure 314 and an AFM layer 315 may optionally be included above the free layer 310 (or above the stack cap layer if included). Dashed lines are used to represent elements of SAF structure 314 and AFM layer 315 to indicate that these structures are optional.

In the embodiment shown in FIG. 3, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (e.g., the y direction) of FIG. 3 and anti-parallel to each other.

In one implementation, the free layer 310 is not exchange coupled to, for example, an antiferromagnet. As a result, the magnetic moment of the free layer 310 is free to rotate under the influence of an applied magnetic field in a range of interest. The read head 300 further includes side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. The magnetoresistive sensor 302 is separated and electrically isolated from the side shields 322 by an isolation layer 324 including, for example, insulating materials. Isolation layer 324 may also be present in other regions of head 300 as shown in FIG. 3.

As noted above, cross-track resolution of a reader is of importance to areal density capability of a HDD. Further, as indicated above, the higher the side shield $M_s$ and/or t and the thinner the free layer-side shield isolation 324 at the junction, the better the cross-track resolution. However, as explained above, increasing these characteristics also increases the free layer 310 bias, which reduces a readback signal amplitude and can thus reduce the reader signal-to-noise ratio (SNR). To address these issues, side shields 322 include two layers, 322A and 322B, magnetized in opposite directions. In each side shield 322, layer 322A is a main bias layer and layer 322B is a compensation bias layer.

In embodiments of the disclosure, main bias layer 322A has a first magnetic moment value, and compensation bias 322B has a second magnetic moment value that is less than the first magnetic moment value. As used herein, a magnetic moment value refers to the product ($M_s t$) of saturation magnetization and film thickness. Thus, to obtain different magnetic moment values (e.g., a higher magnetic moment value in layer 322A than in layer 322B), either saturation magnetization ($M_s$) or film thickness (t) or both $M_s$ and t may be varied in any suitable manner.

In some embodiments, when the $M_s$ values of both main bias layer 322A and compensation bias layer 322B are substantially the same (e.g., layers 322A and 322B are formed of a same material), compensation bias layer 322B may have a thickness that is substantially less than the thickness of the main bias layer 332A. For example, in one embodiment, main bias layer 322A has a $M_s$ value of about 2.0 Tesla (T) and a t value of about 12 nanometers (nm), and compensation bias layer 322B has a $M_s$ value of about 2.0 T and a t value of about 6 nm. In another embodiment, main bias layer 322A has a $M_s$ value of about 2.2 T and a t value of about 12 nm, and compensation bias layer 322B has a $M_s$ value of about 2.2 T and a t value of about 8 nm. A low frequency amplitude (e.g., a readback signal amplitude measured at the reader when it reads long bits from a data storage medium) obtained from a reader with such a bi-layered side shield is substantially equal to a low frequency amplitude obtained from a reader with a single-layered side shield having a $M_s$ value of about 1.6 T and a thickness of 12 nm.

In embodiments in which a thickness of main bias layer 322A is approximately commensurate or substantially commensurate with a thickness of compensation bias layer 322B (e.g., a thickness of the layer 322A is be equal to, slightly greater than, or slightly less than the thickness of the layer 322B), compensation bias layer 322B may be formed of a material having a first $M_s$ value (for example, formed of NiFe) and main bias layer 322A may be formed of a material having a second higher $M_s$ value (for example, formed of a material having a higher $M_s$ value than NiFe). In such embodiments, examples of relatively high-$M_s$ materials that can be utilized for main bias layer 322B with the $M_s$ value higher than NiFe are CoFe and CoNiFe. Of course, other high-$M_s$ magnetic materials may also be suitable to obtain the desired higher moment value. In general, any suitable $M_s$ and t values may be used in different embodiments to provide main bias layer 322A with a higher magnetic moment value than compensation bias layer 322B.

In the embodiment of FIG. 3, a separation layer 311 is included between main bias layer 322A and compensation bias layer 322B. Separation layer 311 may include a decoupling layer, a layer that creates a negative Ruderman-Kittel-Kasuya-Yosida (RKKY) coupling, or a layer having two portions (e.g., a decoupling layer portion 311A and a negative RKKY coupling layer portion 311B). Examples of separation layer 311 are provided further below in connection with FIGS. 5A-5C.

In the embodiment shown in FIG. 3, optional SAF shielding structure 314 includes a SAF shield reference layer 326, a thin SAF shield separation layer 328, which may comprise a metal such as Ru in some embodiments, and an SAF shield pinned layer 330. Because, in some embodiments, sensor 300 utilizes soft side shields 322, SAF shield reference layer 326 may have a relatively fixed magnetization to assist in stabilizing the magnetizations of side shields 322. Thus, in such embodiments, an AFM layer 315 is employed to pin the magnetization of SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe).

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3, either into the plane of the figure, or out of the plane of the figure. Thus, when the magnetoresistive sensor 302 passes over a data bit, the magnetic moment of the free layer 310 is rotated either into the plane of FIG. 3 or out of the plane of FIG. 3, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

Figure 4:
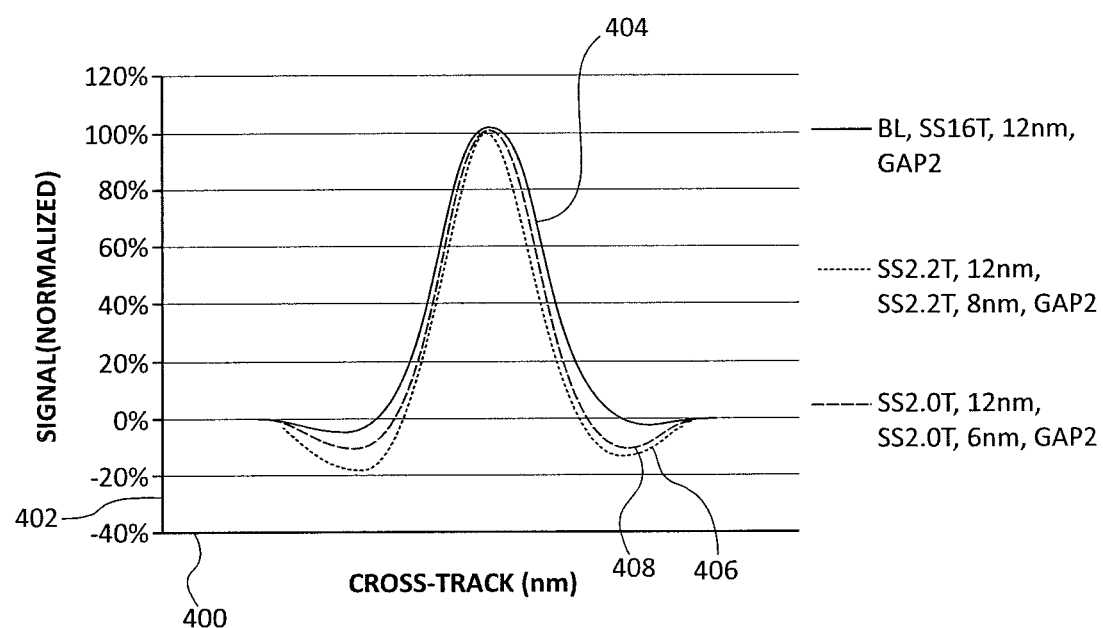
FIG. 4 is a graph illustrating microtrack amplitude profiles for different readers.

FIG. 4 is a graph illustrating microtrack amplitude profiles for different readers. In FIG. 4, horizontal axis 400 represents cross-track dimensions in nanometers (nm), and vertical axis 402 represents normalized signal amplitude. A first plot 404 is for a baseline reader design that has single-layered side shields, with the single layer having a magnetic moment value of 1.6 T. A gap between the free later and the side shield is 2 nm. For the baseline reader design represented by plot 404, MT10=42.9 nm, MT50=26.2 nm and MT10/MT50=1.64. A second plot 406 is for a first bi-layered side shield reader embodiment, with each of the main bias layer and the compensation bias layer having a magnetic moment value of 2.2 T. A thickness of the main bias layer is 12 nm, and a thickness of the compensation bias layer is 8 nm. A gap between the free later and the side shield is 2 nm. For the first bi-layered side shield embodiment represented by plot 406, MT10=35.2 nm, MT50=22.6 nm and MT10/MT50=1.56. In the first bi-layered side shield embodiment, the MT10 gain relative to the baseline design is 7.7 nm, which translates into a 11 nm read width gain, or a 4.4 dB reader SNR gain. A third plot 408 is for a second bi-layered side shield reader embodiment, with each of the main bias layer and the compensation bias layer having a magnetic moment value of 2.0 T. A thickness of the main bias layer is 12 nm, and a thickness of the compensation bias layer is 6 nm. A gap between the free later and the side shield is 2 nm. For the second bi-layered side shield embodiment represented by plot 408, MT10=37.9 nm, MT50=23.9 nm and MT10/MT50=1.59. In the second bi-layered side shield embodiment, the MT10 gain relative to the baseline design is 5.0 nm, which translates into a 7 nm read width gain, or a 2.8 dB reader SNR gain. In addition, the MT10/MT50 ratio in both the first and second bi-layered side shield reader embodiments is better than that obtained in the baseline reader design.

Figure 5A:
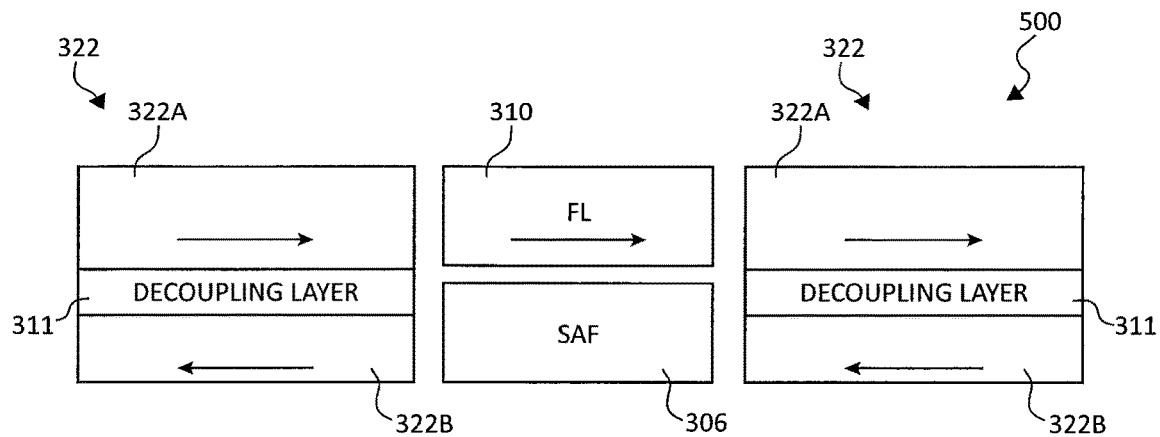
FIGS. 5A-5C are bearing surface views of different reader embodiments.

As described above in connection with FIG. 3, embodiments of the disclosure provide a reader with side shields having two layers 322A and 322B magnetized in the opposite directions, thereby allowing for an increase in the side shield 322 moment and thickness without degrading the readback signal amplitude. The antiparallel magnetization of the main bias layer 322A and the compensation bias layer 322B of the side shields 322 may be achieved by:

(1) Decoupling layers 322A and 322B with a layer 311 breaking the exchange, such as Ta, Ir, etc. The stray fields from the layers 322A and 322B will push their magnetizations in opposite directions. Such an embodiment in which 311 is a decoupling layer in reader 500 is shown in FIG. 5A.

Figure 5B:
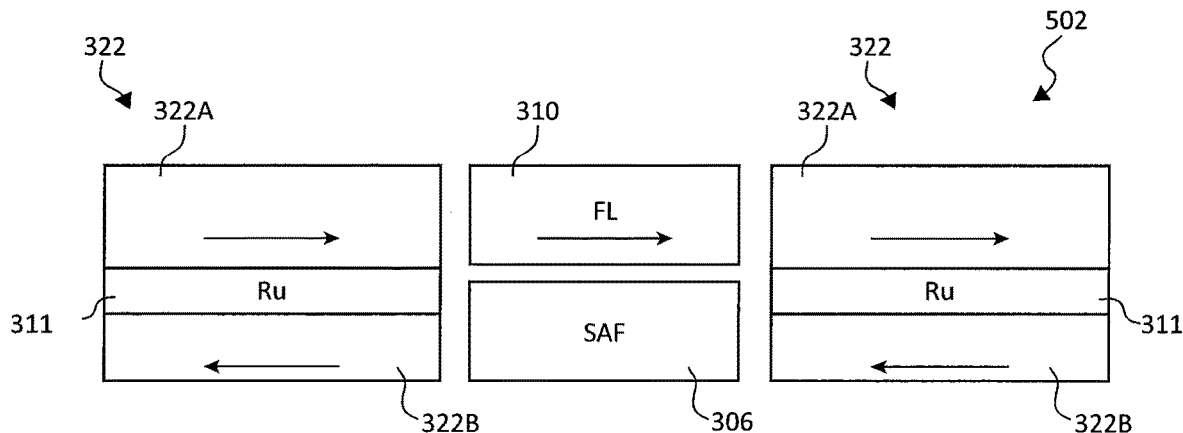

(2) Forming a layer 311 that creates a negative RKKY coupling, such as Ru between the layers 322A and 322B, instead of employing a decoupling layer. This is shown in FIG. 5B, which includes a reader 502 with Ru as the negative RKKY coupling layer 311 in shields 322. However, materials other than Ru that are capable of providing the negative RKKY coupling may also be employed instead of Ru.

Figure 5C:
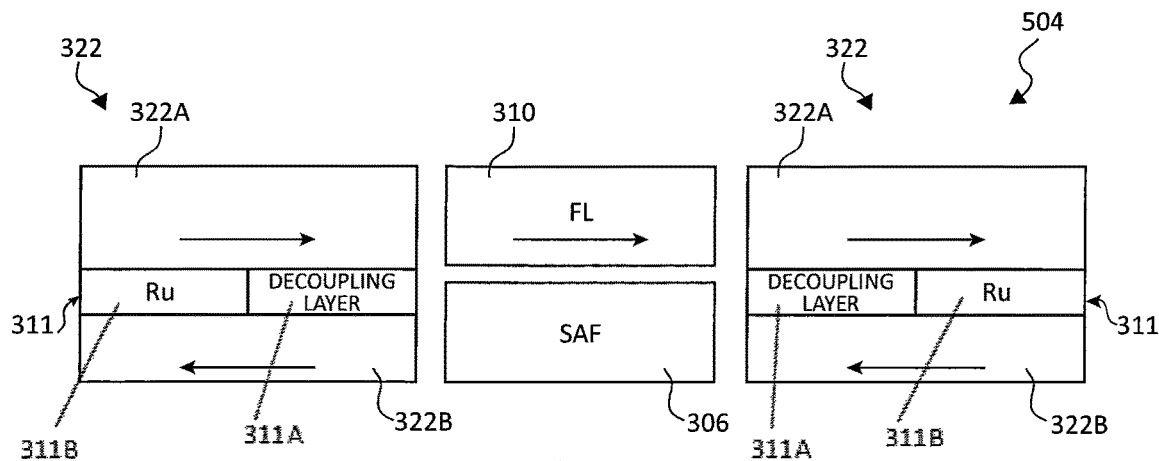

(3) Because it may be difficult to preserve Ru thickness (and thus coupling) at the junction, in some embodiments, Ru may be employed away from the junction, but replaced with a decoupling layer at the junction. Such an embodiment in which portion 311A is a decoupling layer portion (e.g., Ta, Ir, etc.) and portion 311B is a negative RKKY coupling layer portion (e.g., Ru) in reader 504 is shown in FIG. 5C.

Figure 6:
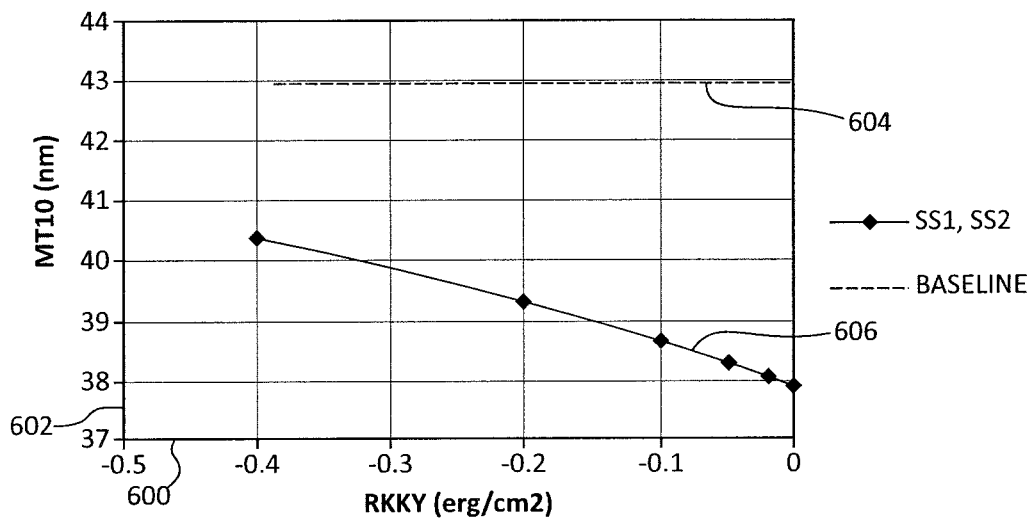
FIG. 6 is a graph illustrating a comparison of results obtained for a baseline reader design, which has a single-layered side shield, with results for readers that include bi-layered side shields.

FIG. 6 is a graph illustrating a comparison of results obtained for a baseline reader design, which has a single-layered side shield, with results for readers that include bi-layered side shields. In FIG. 6, a horizontal axis 600 represents RKKY coupling in ergs/square centimeter ($cm^2$), and vertical axis 602 represents MT10 in nm. Plot 604 is for the baseline reader design, and plot 606 shows results for readers with bi-layered side shields. As can be seen in FIG. 6, although RKKY degrades MT10, the readers with bi-layered side shields (plot 606) still show a significantly better MT10 than the baseline reader design (plot 604). Point RKKY 0 corresponds to the embodiments of FIGS. 5A and 5C.

Figure 7:
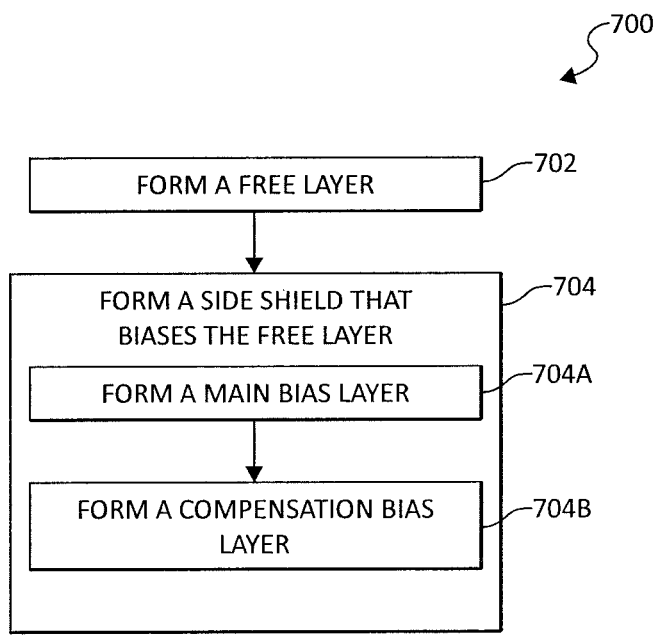
FIG. 7 is a flow diagram of a method embodiment.

FIG. 7 is a flow diagram of a method 700 of forming a reader in accordance with one embodiment. The method 700 includes forming a free layer at 702, and forming a side shield that biases the free layer at 704. Forming the side shield includes, at 704A, forming a main bias layer having a first magnetic moment value and a first magnetization direction. Forming the side shield further includes, at 704B, forming a compensation bias layer having a second magnetic moment value that is less than the first magnetic moment value and a second magnetization direction that is opposite to the first magnetization direction.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reader comprising:
   a free layer; and
   a side shield that biases the free layer, the side shield comprising:
      a main bias layer having a first magnetic moment value and a first magnetization direction, the main bias layer having an upper surface that is in direct physical contact with a magnetic layer; and
      a compensation bias layer, below the main bias layer, having a second magnetic moment value that is less than the first magnetic moment value and a second magnetization direction that is opposite to the first magnetization direction, the compensation bias layer having a lower surface that is in direct physical contact with an isolation layer.

2. The reader of claim 1 and wherein a saturation magnetization value of the main bias layer is substantially equal to a saturation magnetization value of the compensation bias layer, and wherein a thickness of the main bias layer is greater than a thickness of the compensation bias layer.

3. The reader of claim 1 and wherein a thickness of the main bias layer is substantially commensurate with a thickness of the compensation bias layer, and wherein a saturation magnetization value of the main bias layer is greater than a saturation magnetization value of the compensation bias layer.

4. The reader of claim 1 and wherein:
a thickness of the main bias layer is greater than a thickness of the compensation bias layer; and
a saturation magnetization value of the main bias layer is greater than a saturation magnetization value of the compensation bias layer.

5. The reader of claim 1 and further comprising a spacer layer between the main bias layer and the compensation bias layer.

6. The reader of claim 5 and wherein at least a portion of the spacer layer comprises a decoupling layer.

7. The reader of claim 5 and wherein at least a portion of the spacer layer comprises a negative Ruderman-Kittel-Kasuya-Yosida (RKKY) coupling layer.

8. The reader of claim 5 and wherein the spacer layer comprises a decoupling layer portion and a negative RKKY coupling layer portion, and wherein the decoupling layer portion is more proximate to the free layer than the negative RKKY coupling layer portion.

9. A method of forming a reader comprising:
forming a free layer; and
forming a side shield that biases the free layer by:
    forming a main bias layer having a first magnetic moment value and a first magnetization direction, the main bias layer being formed such that an upper surface of the main bias layer is in direct physical contact with a magnetic layer; and
    forming a compensation bias layer having a second magnetic moment value that is less than the first magnetic moment value and a second magnetization direction that is opposite to the first magnetization direction, the compensation bias layer being formed below the main bis layer and being formed such that a lower surface of the compensation bias layer is in direct physical contact with an isolation layer.

10. The method of claim 9 and wherein a saturation magnetization value of the main bias layer is substantially equal to a saturation magnetization value of the compensation bias layer, and wherein a thickness of the main bias layer is greater than a thickness of the compensation bias layer.

11. The method of claim 9 and wherein a thickness of the main bias layer is substantially commensurate with a thickness of the compensation bias layer, and wherein a saturation magnetization value of the main bias layer is greater than a saturation magnetization value of the compensation bias layer.

12. The method of claim 9 and wherein:
a thickness of the main bias layer is greater than a thickness of the compensation bias layer; and
a saturation magnetization value of the main bias layer is greater than a saturation magnetization value of the compensation bias layer.

13. The method of claim 9 and further comprising forming a spacer layer between the main bias layer and the compensation bias layer.

14. The method of claim 13 and wherein at least a portion of the spacer layer comprises a decoupling layer.

15. The method of claim 13 and wherein at least a portion of the spacer layer comprises a negative Ruderman-Kittel-Kasuya-Yosida (RKKY) coupling layer.

16. The method of claim 13 and wherein the spacer layer comprises a decoupling layer portion and a negative RKKY coupling layer portion, and wherein the decoupling layer portion is more proximate to the free layer than the negative RKKY coupling layer portion.

17. A reader comprising:
a free layer; and
a side shield that biases the free layer, the side shield comprising:
    a main bias layer having a first magnetic moment value and a first magnetization direction;
    a compensation bias layer having a second magnetic moment value that is less than the first magnetic moment value and a second magnetization direction that is opposite to the first magnetization direction; and
    a spacer layer between the main bias layer and the compensation bias layer, the spacer layer comprising a decoupling layer portion and a negative Ruderman-Kittel-Kasuya-Yosida (RKKY) coupling layer portion, with the decoupling layer portion being more proximate to the free layer than the negative RKKY coupling layer portion.

18. The reader of claim 17 wherein a saturation magnetization value of the main bias layer is substantially equal to a saturation magnetization value of the compensation bias layer, and wherein a thickness of the main bias layer is greater than a thickness of the compensation bias layer.

19. The reader of claim 17 and wherein a thickness of the main bias layer is substantially commensurate with a thickness of the compensation bias layer, and wherein a saturation magnetization value of the main bias layer is greater than a saturation magnetization value of the compensation bias layer.

20. The reader of claim 17 and wherein:
a thickness of the main bias layer is greater than a thickness of the compensation bias layer; and
a saturation magnetization value of the main bias layer is greater than a saturation magnetization value of the compensation bias layer.

* * * * *